United States Patent
Kanda et al.

(10) Patent No.: US 8,927,647 B2
(45) Date of Patent: *Jan. 6, 2015

(54) POLYAMIDE RESIN

(75) Inventors: Tomomichi Kanda, Niigata (JP);
Hisayuki Kuwahara, Kanagawa (JP);
Shun Ogawa, Kanagawa (JP); Takahiko Sumino, Kanagawa (JP); Kentaro Ishii, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 247 days.

This patent is subject to a terminal disclaimer.

(21) Appl. No.: 13/119,262

(22) PCT Filed: Sep. 15, 2009

(86) PCT No.: PCT/JP2009/066077
§ 371 (c)(1),
(2), (4) Date: May 31, 2011

(87) PCT Pub. No.: WO2010/032719
PCT Pub. Date: Mar. 25, 2010

(65) Prior Publication Data
US 2011/0224370 A1    Sep. 15, 2011

(30) Foreign Application Priority Data

Sep. 18, 2008 (JP) .................. 2008-239363

(51) Int. Cl.
*C08L 77/06* (2006.01)
*C08G 69/26* (2006.01)
(52) U.S. Cl.
CPC ............... *C08L 77/06* (2013.01); *C08G 69/26* (2013.01); *C08G 69/265* (2013.01)
USPC ............................ 524/606; 528/335; 528/338
(58) Field of Classification Search
USPC .................... 524/606; 528/335, 338
See application file for complete search history.

(56) References Cited

U.S. PATENT DOCUMENTS

| 5,587,447 | A  | * | 12/1996 | Harada et al. ................ 528/347 |
| 8,440,756 | B2 | * | 5/2013  | Ishii et al. ................... 524/469 |
| 2007/0213434 | A1 | * | 9/2007 | Lima ............................. 524/112 |
| 2008/0262193 | A1 |   | 10/2008 | Kurose et al. |
| 2009/0299027 | A1 |   | 12/2009 | Kurose et al. |
| 2009/0299028 | A1 |   | 12/2009 | Kikuchi et al. |
| 2010/0063245 | A1 |   | 3/2010  | Rulkens |
| 2011/0245454 | A1 |   | 10/2011 | Kuwahara et al. |
| 2012/0065303 | A1 |   | 3/2012  | Ogawa et al. |
| 2012/0065327 | A1 |   | 3/2012  | Ogawa et al. |
| 2012/0172512 | A1 |   | 7/2012  | Ishii et al. |
| 2012/0172572 | A1 |   | 7/2012  | Ishii et al. |
| 2012/0177937 | A1 |   | 7/2012  | Ogawa et al. |

FOREIGN PATENT DOCUMENTS

| EP | 2 327 738 A1 | 6/2011 |
| EP | 2 436 717 A1 | 4/2012 |
| EP | 2 479 218 A1 | 7/2012 |
| EP | 2 479 219 A1 | 7/2012 |
| JP | 32 6148      | 8/1957 |
| JP | 38 7893      | 6/1963 |
| JP | 47 15106     | 5/1972 |
| JP | 49 35358     | 9/1974 |
| JP | 5 170897     | 7/1993 |
| JP | 6 192416     | 7/1994 |
| JP | 2008 280535  | 11/2008 |
| WO | WO 2007/085406 A1 | 8/2007 |

OTHER PUBLICATIONS

International Search Report Issued Nov. 17, 2009 in PCT/JP09/066077 filed Sep. 15, 2009.
Extended Search Report issued Mar. 25, 2013 in European Application No. 09814564.2.
Office Action issued Jul. 26, 2012 in Russian Patent Application No. 2011115093/05 (with English language translation).

* cited by examiner

*Primary Examiner* — Tae H Yoon
(74) *Attorney, Agent, or Firm* — Oblon, Spivak, McClelland, Maier & Neustadt, L.L.P.

(57) ABSTRACT

A polyamide resin composed of constitutional units derived from a diamine component 70 mol % or more of which is derived from p-xylylenediamine and constitutional unit derived from a dicarboxylic acid 70 mol % or more of which is derived from an aliphatic dicarboxylic acid having 6 to 18 carbon atoms. The polyamide resin has a number average molecular weight (Mn) of 10,000 to 50,000 and a degree of dispersion (weight average molecular weight/number average molecular weight=Mw/Mn) satisfying the following formula (1):

$1.5 \leq (Mw/Mn) \leq 6.0$, wherein Mw and Mn are determined by gel permeation chromatography (GPC).

9 Claims, No Drawings

POLYAMIDE RESIN

TECHNICAL FIELD

The present invention relates to a novel polyamide resin, particularly relates to a polyamide resin being excellent particularly in molding and processing ability and also having high heat resistance, low water absorption, high chemical resistance, and good mechanical property, and more particularly relates to a polyamide resin having a specific range of molecular weight and a limited range of molecular weight dispersion. The polyamide resin is suitably applicable to the production of articles for industrial and domestic use, such as automobile parts, parts of electric and electronic equipments, and machine parts.

BACKGROUND ART

Crystalline polyamide resins, such as nylon 6 and nylon 66, have been widely used as fibers for clothes and engineering plastics for the production of automobile parts, machine parts, and parts of electric and electronic equipments, because they are excellent in toughness, chemical resistance, and electrical characteristics and easy to melt mold and process. However, the usable range of such resins in the above application fields is limited by their insufficient heat resistance, poor dimension stability due to water absorption, and insufficient mechanical strength. Particularly, in the application to automobile parts in which plastic parts are rapidly replacing metallic parts and the application to parts of electric and electronic equipments for use in surface mount technology (SMT) which is rapidly progressing with the advance of semiconductor technology, high performance which is difficult to achieve by known polyamide resins is required. Therefore, a polyamide resin excellent in heat resistance, dimension stability, and mechanical property is required.

As compared with known polyimide resins, the aromatic ring-containing polyamide resin (hereinafter may be referred to as "nylon MXD") produced from m-xylylenediamine and adipic acid is characterized by high strength, high modulus of elasticity and low water absorption, and therefore, comes into use for the production of automobile part and parts of electric and electronic equipments which are required to be light in weight and small in size as substituents for metallic parts. In addition, the aromatic ring-containing polyamide resin has high gas barrier properties and finds its use for packaging materials, such as food packaging materials, which are required to prevent the permeation of gas.

As compared with nylon 6 and nylon 66, the crystallization speed of nylon MXD 6 is low. Therefore, nylon MXD 6 alone is difficult to crystallize in the mold for injection molding, this making the thin-wall molding difficult or likely to cause problem of deformation of molded article or decrease in mechanical strength. Therefore, to mold nylon MXD 6, it is required to increase the crystallization speed by blending a crystallization accelerator, such as nylon 66 and talc powder each having high crystallization speed, or improve the moldability by raising the mold temperature (Patent Document 1). However, as compared with the use of nylon MXD 6 alone, the properties change largely in a moist atmosphere when nylon 66 is blended, and the mechanical strength is reduced when talc powder is blended. Therefore, the blending amount is limited.

To remove this drawback, it has been proposed to enhance the crystallizability by introducing a rigid molecular structure into the molecular chain of polyamide. For example, a polyamide resin produced by the copolymerization of a diamine component composed of 15 to 65 mol % of p-xylylenediamine and 85 to 35 mol % of m-xylylenediamine and a dicarboxylic acid component composed of 45 to 80 mol % of a α,ω-aliphatic dicarboxylic acid having 6 to 12 carbon atoms and 20 to 55 mol % of an aromatic carboxylic acid such as terephthalic acid has been proposed (Patent Document 2). Although the crystallizability can be increased by increasing the content of p-xylylene, the melting point is excessively increased and the polyamide resin is likely to be thermally degraded during melt polymerization and melt processing. Therefore, the content of p-xylylene cannot be increased enough. If the content of the aromatic dicarboxylic acid is increased, the melt viscosity is excessively increased to reduce the molding and processing ability.

A wholly aliphatic polyamide produced from adipic acid and 1,4-butanediamine (hereinafter may be referred to as "nylon 46") is heat-resistant and has a good moldability suitable for the production of thin-wall or small-sized parts because of its high melting point, high crystallinity, and relatively low melt viscosity. However, its high water absorption reduces various properties such as dimension stability under conditions for practical use.

A semiaromatic polyamide produced from terephthalic acid and 1,6-hexamethylenediamine (hereinafter may be referred to as "nylon 6T") has a melting point of around 370° C. which exceeds its decomposition temperature. Therefore, the melt polymerization and melt molding are difficult, this making nylon 6T unsuitable for practical use. It has been proposed to reduce the melting point to a moldable temperature range, for example, around 320° C., by copolymerizing adipic acid, isophthalic acid or ε-caprolactam in an amount of about 30 to 40 mol % (Patent Documents 3 and 4). However, the crystallization speed and crystallinity to be attained are reduced by the copolymerization, this deteriorating several properties, for example, rigidity at high temperatures, chemical resistance and dimension stability as well as elongating the molding cycle to reduce productivity. In addition, the moldability is poor because the viscosity is likely to be reduced when kept in a molten state.

A semiaromatic polyamide produced from terephthalic acid, 1,9-nonamethylenediamine and 2-methyl-1,8-octamethylenediamine (hereinafter may be referred to as "nylon 9T") has been proposed (Patent Document 5). As compared with nylon 6T, nylon 9T has a high crystallization speed, high crystallinity to be attained, and low water absorption and put into practical use. However, nylon 9T involves the same problems as mentioned above, i.e., properties are deteriorated by copolymerization, the melt flowability is lowered because the main component is aromatic dicarboxylic acid, an extremely high mold temperature is needed to make the molding difficult, and the productivity is low.

Patent Document 6 discloses a polyamide produced from a diamine component composed of an amount of p-xylylenediamine and a smaller amount of m-xylylenediamine and a dicarboxylic acid component composed of a straight-chain aliphatic dicarboxylic acid having 11 or more carbon atoms. This document teaches that a polyamide constituted by p-xylylenediamine and a straight-chain aliphatic dicarboxylic acid having 10 or less carbon atoms has a poor processability and is not suitable for practical use, because the melting point is close to the decomposition point.

Patent Document 1: JP 54-32458B
Patent Document 2: JP 3456501B
Patent Document 3: JP 64.11073B
Patent Document 4: JP 3-56576B
Patent Document 5: JP 3242781B
Patent Document 6: JP 47-15106B

DISCLOSURE OF THE INVENTION

An object of the invention is to solve the above problems and provide a polyamide resin having particularly excellent molding and processing ability as well as high heat resistance, low water absorption, chemical resistance, and good mechanical property.

As a result of extensive research, the inventors have found that a polyamide resin comprising constitutional units derived from p-xylylenediamine and constitutional units derived from aliphatic dicarboxylic acid having 6 to 18 carbon atoms and having a specific molecular weight and a limited molecular weight dispersion has particularly excellent molding and processing ability as well as high heat resistance, low water absorption, chemical resistance, and good mechanical property. The invention is based on this finding.

Namely, the present invention relates to a polyamide resin comprising constitutional units derived from diamine component and constitutional units derived from dicarboxylic acid component, wherein 70 mol % or more of the constitutional units derived from diamine component is derived from p-xylylenediamine, 70 mol % or more of the constitutional units derived from dicarboxylic acid component is derived from an aliphatic dicarboxylic acid having 6 to 18 carbon atoms, a number average molecular weight (Mn) is 10,000 to 50,000 and a degree of dispersion (weight average molecular weight/number average molecular weight=Mw/Mn) satisfies the following formula (1):

$$1.5 \leq (Mw/Mn) \leq 6.0 \quad (1),$$

when determined by a gel permeation chromatography (GPC).

The polyamide resin of the invention has particularly excellent molding and processing ability as well as high heat resistance, low water absorption, and good mechanical property. Therefore, the polyamide resin is suitable for the production of small-sized or thin-wall molded articles in which high crystallization speed, high crystallinity and low water absorption are required, and automobile parts such as reflector of headlight and parts around engine in which heat resistance and rigidity are required. Since the polyamide resin can be molded and processed into films, sheets, tubes, and fibers, it is also suitable for the production of industrial and household articles.

BEST MODE FOR CARRYING OUT THE INVENTION

In the polyamide resin of the invention, 70 mol % or more, preferably 80 mol % or more and still more preferably 90 mol % or more (each inclusive of 100%) of the constitutional units derived from diamine component is derived from p-xylylenediamine, and 70 mol % or more, preferably 80 mol % or more and still more preferably 90 mol % or more (each inclusive of 100%) of the constitutional unit derived from dicarboxylic acid component is derived from an aliphatic dicarboxylic acid having 6 to 18 carbon atoms.

The polyamide resin is produced by the polycondensation of a diamine component containing p-xylylenediamine in an amount of 70 mol % or more, preferably 80 mol % or more and more preferably 90 mol % or more (each inclusive of 100%) and a dicarboxylic acid component containing the aliphatic dicarboxylic acid having 6 to 18 carbon atoms in an amount of 70 mol % or more, preferably 80 mol % or more and still more preferably 90 mol % or more (each inclusive of 100%). The melting point and crystallizability of the polyamide resin become higher and the heat resistance and chemical resistance of the polyamide resin become more excellent, as the concentration of p-xylylenediamine in the diamine component is increased. If the concentration of p-xylylenediamine in the diamine component is less than 70 mol %, the heat resistance and chemical resistance are unfavorably low.

The diamine usable as the diamine component other than p-xylylenediamine may include m-xylylenediamine, 1,3-bis (aminomethyl)cyclohexane, 1,4-bis(aminomethyl)cyclohexane, tetramethylenediamine, hexamethylenediamine, octamethylenediamine, nonamethylenediamine, decamethylenediamine, 2-methyl-1,5-pentanediamine, p-phenylenediamine, m-phenylenediamine, and mixture thereof, although not limited thereto.

When the content of the units derived from the aliphatic dicarboxylic acid having 6 to 18 carbon atoms in the constitutional units derived from dicarboxylic acid is 70 mol % or more, the polyamide resin has melt flowability, high crystallizability, low water absorption, good heat resistance, and good chemical resistance, thereby making the polyamide resin suitable for the use intended by the invention. Examples of the aliphatic dicarboxylic acid having 6 to 18 carbon atoms include at least one straight-chain or branched aliphatic dicarboxylic acid selected from adipic acid, 2-methyladipic acid, trimethyladipic acid, 2,2-dimethylglutaric acid, 2,4-dimethylglutaric acid, 3,3-dimethylglutaric acid, 3,3-diethylsuccinic acid, pimelic acid, suberic acid, azelaic acid, sebacic acid, undecanedioic acid, dodecanedioic acid, tridecanedioic acid, tetradecanedioic acid, pentadecanedioic acid, and hexadecanedioic acid, with at least one aliphatic dicarboxylic acid having 6 to 12 carbon atoms selected from adipic acid, azelaic acid, sebacic acid, undecanedioic acid, and dodecanedioic acid being preferred, and at least one aliphatic dicarboxylic acid having 6 to 10 carbon atoms selected from adipic acid, azelaic acid, and sebacic acid being more preferred. If an aliphatic dicarboxylic acid having 5 or less carbon atoms is used in place of the aliphatic dicarboxylic acid having 6 to 18 carbon atoms, the dicarboxylic acid is distilled out of the reaction system during the polycondensation because of its low melting point and boiling point, thereby failing to obtain the intended molar balance. In addition, the heat stability of the obtained polyamide is unfavorably low. An aliphatic dicarboxylic acid having carbon atoms exceeding 18 is not preferred because the intended heat resistance is not obtained because of its low melting point, although a polyamide resin with stable properties is obtained.

The other dicarboxylic acid usable in an amount of less than 30 mol % of the dicarboxylic acid component may include malonic acid, succinic acid, glutaric acid, 1,3-cyclopentanedicarboxylic acid, 1,3-cyclohexanedicarboxylic acid, 1,4-cyclohexanedicarboxylic acid, isophthalic acid, terephthalic acid, 2,6-naphthalenedicarboxylic acid, 1,5-naphthalenedicarboxylic acid, 1,4-naphthalenedicarboxylic acid, and 2,7-naphthalenedicarboxylic acid, although not limited thereto.

In the polycondensation for the production of the polyamide resin of the invention, a mono-functional compound reactive with the terminal amino group or terminal carboxylic group of polyamide may be added in a small amount as a molecular weight modifier. Examples thereof include monocarboxylic acid, such as acetic acid, propionic acid, butyric acid, valeric acid, caprylic acid, caprylic acid, lauric acid, tridecylic acid, myristic acid, palmitic acid, stearic acid, pivalic acid, cyclohexanecarboxylic acid, benzoic acid, toluic acid, and naphthalenecarboxylic acid; monoamine; acid anhydride, such as phthalic anhydride; monoisocyanates; mono acid halide; mono ester; and mono alcohol.

The preferred amount of the molecular weight modifier to be used varies according to the reactivity and boiling point thereof and reaction conditions, and generally about 0.1 to 10 mol % of the total amount of the diamine component and the dicarboxylic acid component.

The polyamide resin of the invention has a number average molecular weight (Mn) of 10,000 to 50,000 and a degree of dispersion (weight average molecular weight/number average molecular weight=Mw/Mn) satisfying the formula (1):

$$1.5 \leq (Mw/Mn) \leq 6.0 \quad (1),$$

when determined by a gel permeation chromatography (GPC).

When Mn is 10,000 or more, the molded article to be obtained has a stable mechanical strength and the melt viscosity is moderate to make the moldability and processability good. When Mn exceeds 50,000, the melt viscosity is excessively high to unfavorably reduce the moldability, although the mechanical strength of molded article is high and stable.

The degree of dispersion (Mw/Mn) means the width of the molecular weight distribution and preferably 1.5 to 4.0, more preferably 1.5 to 3.0. A known polyamide produced by a general melt polymerization has a degree of dispersion exceeding 6.0 depending upon the reactivity of starting diamine and dicarboxylic acid, the heat history subjected during the production such as reaction temperature and reaction time, the molar balance of starting materials, molecular weight modifier, and other reaction conditions. In particular, since the polyamide resin is exposed to high temperatures during the melt polycondensation, the polyamide molecule is damaged and an abnormal reaction (formation of three-dimensional polymer) such as non-linear molecular growth occurs, to likely form a colored, deteriorated product and gel and make the degree of dispersion large. To make the degree of dispersion small, it is important to produce the polyamide resin by the method described below, and it is effective to control the charge ratio, i.e., diamine component/dicarboxylic acid component, such that the polyamide resin to be obtained has a molar balance of slightly carboxylic acid excess; add a monocarboxylic acid as the molecular weight modifier; use a low polymerization temperature; and reduce the polymerization time. If the degree of dispersion is larger than 6.0, the melt flowability and melt viscosity are less stable and the melt kneading ability and the melt molding and processing ability are deteriorated. In addition, the toughness is extremely lowered and the properties, such as water absorption resistance, chemical resistance, and thermal aging resistance, are also unfavorably reduced. If the degree of dispersion is smaller than 1.5, the flowability is high. However, the degree of flowability changes largely according to the variation of the melt molding conditions such as temperature, to form flash and make the properties of molded article uneven.

After maintained in a molten state at a temperature higher than the melting point by 10 to 20° C. for 30 min, the retention of melt viscosity (%) of the polyamide resin preferably satisfies the following formula (2):

$$70 < (a/b) \times 100 < 130 \quad (2)$$

wherein a is a melt viscosity (Pa·s) after maintained in a molten state for 30 min and b is a melt viscosity (Pa·s) after 2.5 rain from starting the melting. The polyamide resin satisfies the formula (2) preferably after maintained in a molten state at a temperature higher than the melting point by 10 to 30° C. for 30 min, more preferably after maintained in a molten state at a temperature higher than the melting point by 10 to 40° C. for 30 min, and still more preferably after maintained in a molten state at a temperature higher than the melting point by 10 to 50° C. for 30 min.

The melt viscosity for evaluating the formula (2) was measured by Capirograph D-1 (Toyo Seiki Seisaku-Sho, Ltd.). A test sample was placed in a cylinder (inner diameter: 1 mm, length: 10 mm) and the melt viscosity b was measured after 2.5 min from starting the melting. The melt viscosity a was measured after maintaining the molten state for 30 min while keeping the molten polyamide resin away from air by piston. The measurement was conducted at the same temperature within a range of higher than the melting point of polyamide resin by 10 to 50° C. and the same shear rate (apparent shear rate of 100/s).

A retention of melt viscosity of 0.7 or less or 1.3 or more is not preferred, because the viscosity varies during the melt processing such as extrusion and injection molding to reduce the moldability, thereby making the properties of molded article uneven. The polyamide resin satisfying the formula (2) is produced by suitably selecting the charge ratio of the starting dicarboxylic acid component and the starting diamine component, polymerization catalyst, and molecular weight modifier and selecting the conditions which make the polymerization temperature low and the polymerization time short.

The relative viscosity of the polyamide resin measured by using a solution in concentrated sulfuric acid (concentration: 1 g/100 mL) at 25° C. (hereinafter may be simply referred to as "relative viscosity") is preferably 1.80 to 4.20, more preferably 1.90 to 3.50, and still more preferably 2.00 to 3.00. If being 1.80 or more, the molded article of the polyamide resin has a sufficient mechanical strength and the resistance to water absorption, chemical resistance, and thermal aging resistance are improved. By regulating the relative viscosity within 1.80 to 4.20, good melt viscosity and moldability are obtained.

The heat of fusion of the polyamide resin is preferably 60 J/g or more when measured by a differential scanning calorimeter (DSC). If being 60 J/g or more, a molded article having a high crystallinity is obtained. To obtain a molded article having a high crystallinity, the heat of crystallization measured upon decreasing the temperature of molten rosin is preferably 40 J/g or more and more preferably 50 J/g or more. By enhancing the crystallinity of molded article, the heat resistance up to around the melting point of the polyamide resin is obtained and the mechanical property, chemical resistance, and resistance to water absorption are improved.

The glass transition temperature (Tg) of the polyamide resin is preferably 60 to 90° C., more preferably 60 to 85° C., and still more preferably 65 to 80° C. Within the above range, a polyamide resin combining a good moldability and a good heat resistance is obtained. If Tg is lower than the above range, since the temperature range within which the crystallization well proceeds during the molding and processing is reduced, the molding temperature for the molding and processing is low and the molding cycle is shortened. However, the heat resistance of the obtained molded article is unfavorably low. If Tg is higher than the above range, the mechanical strength of non-crystallized portion of the obtained molded article may be retained at higher temperatures. However, the crystallization is unfavorably difficult to proceed during the molding and processing.

The melting point (Tm) of the polyamide resin is preferably 270 to 300° C. (543 to 573 K), more preferably 275 to 300° C., and still more preferably 280 to 300° C. when measured by a differential scanning calorimeter (DSC). Within the above range, the heat resistance of the polyamide resin is good.

The ratio (Tg/Tm) of the glass transition temperature (Tg) and the melting point (Tr) of the polyamide resin preferably satisfies the following formula (3):

$$0.600 \leq (Tg/Tm) \leq 0.650 \qquad (3)$$

wherein Tg is a glass transition temperature and Tm is a melting point each expressed by absolute temperature (K).

Within the above range, the polyamide resin combines a good moldability and a good heat resistance.

The difference between the melting point (Tm) and the crystallization temperature upon cooling (Tcc) of the polyamide resin preferably satisfies the following formula (4):

$$20 \leq Tm - Tcc \leq 40 \qquad (4).$$

Generally, the crystallization speed tends to become large as the difference between Tm and Tcc measured by DSC is reduced.

The polyamide resin of the invention having the properties mentioned above is produced by the melt polycondensation described below. If a polyamide resin having a higher molecular weight is intended, it is preferred to subject a low viscosity polyamide obtained by the melt polycondensation to heat treatment in a solid state, i.e., solid-state polymerization. The method of solid-state polymerization is not particularly limited and may be conducted in an inert gas atmosphere or under reduced pressure using a batch-wise heating apparatus.

The polyamide resin of the invention is produced by the polycondensation of the diamine component and the dicarboxylic acid component without using a solvent. The polycondensation is conducted by continuously or intermittently adding the diamine component to the dicarboxylic acid component under pressure while stirring the dicarboxylic acid component maintained in a molten state in a reaction vessel. The reaction mixture is preferably maintained in a molten state during the addition of the diamine component by sequentially raising the temperature of the reaction mixture to regulate the temperature with a range from the melting point to the melting point+20° C. If the temperature of the reaction mixture is lower than the melting point, the reaction mixture may be solidified in the reaction vessel. If higher than the melting point+20° C., the reaction mixture may be degraded. At the time the addition is completed, the temperature of the reaction mixture is preferably regulated to the melting point of the intended polyamide or higher while maintaining the reaction mixture in a molten state. The melting point of the reaction mixture can be measured successively by DSC, etc.

The addition speed of the diamine component is selected so as to maintain the reaction system in a uniform molten state by taking the generated heat of amidation, the heat required to distill off the water eliminated by condensation (eliminated water), the heat supplied to the reaction mixture from a heating medium through the wall of reaction vessel, and the structure of the portion for separating the eliminated water and the starting materials into consideration. The time taken to add the diamine component varies according to the size of the reaction vessel and is generally 0.5 to 5 h. During the addition, the eliminated water which is formed as the reaction proceeds is distilled out of the reaction system. The scattered starting materials such as the diamine and the dicarboxylic acid are separated from the eliminated water and returned to the reaction vessel. The starting materials and the eliminated water are separated preferably by a partial condenser and the eliminated water is distilled off preferably through a total condenser.

The reaction pressure varies according the kind of dicarboxylic acid component to be used and the kind of diamine component other than p-xylylenediamine, and preferably 0.1 to 0.6 MPa and more preferably 0.2 to 0.5 MPa. The pressure may be applied by an inert gas, such as nitrogen, or vapor of the eliminated water formed during the reaction.

After the addition of the diamine component, the pressure of the reaction system is reduced finally to 0.08 MPa or lower. Although the interval from the completion of the addition to the start of pressure reduction is not particularly limited, it is preferred to start the pressure reduction within 30 min after the completion of the addition. The rate of reducing pressure is selected so as to prevent the non-reacted diamine from being distilled out of the reaction system together with the water and, for example, selected from the range from 0.1 to 1.0 MPa/h. A low rate of reducing pressure is not preferred, because the time required for the production is long and the polyamide resin may be thermally degraded during a long operation of reducing pressure.

The polycondensation may be terminated at the time the pressure is reduced to atmospheric pressure or may be terminated after continuing the polycondensation for a predetermined period of time under atmospheric pressure or reduced pressure. The temperature is preferably maintained so as to prevent the polyamide being produced from being solidified, i.e., within the range from the melting point of the polyamide resin being produced to the melting+30° C.

The melt polycondensation is conducted in the presence of a polymerization catalyst. Examples of the polymerization catalyst include a phosphorus compound, such as phosphoric acid, phosphorous acid, and hypophosphorous acid, and salt and ester thereof. Examples of the salt include a salt of metal, such as potassium, sodium, magnesium, calcium, zinc, cobalt, manganese, tin, tungsten, vanadium, germanium, titanium, and antimony, and an ammonium salt. Examples of the ester include ethyl ester, isopropyl ester, butyl ester, hexyl ester, octadecyl ester, stearyl ester, and phenyl ester. To prevent the polymerization catalyst from aggregating in the polyamide resin or prevent the abnormal reaction each of which is caused by the thermal degradation of the polymerization catalyst, an alkali metal compound or an alkaline earth metal compound may be combinedly used. Examples thereof include an alkali metal hydroxide and an alkaline earth metal hydroxide, such as sodium hydroxide, calcium hydroxide, potassium hydroxide, and magnesium hydroxide; and an alkali metal salt and an alkaline earth metal salt of carbonic acid, boric acid, acetic acid, propionic acid, butyric acid, isobutyric acid, crotonic acid, valeric acid, caproic acid, isocaproic acid, enanthic acid, caprylic acid, pelargonic acid, stearic acid, cyclopentanecarboxylic acid, cyclohexanecarboxylic acid, hydrocinnamic acid, γ-phenylbutyric acid, p-phenoxybenzoic acid, o-oxycinnamic acid, o-β-chlorophenylpropionic acid, and m-chlorophenylpropionic acid, although not limited thereto.

The polyamide resin having a relative viscosity of 1.80 to 4.20 measured using a solution in concentrated sulfuring acid (concentration: 1 g/100 mL) at 25° C. is easily produced by continuing the melt polymerization until the relative viscosity reaches the predetermined value. The melt polymerization for the production of polyamide resin is conducted at high temperatures. Therefore, if the melt polymerization time (reaction time) is long, the molecule of polyamide is damaged or the abnormal reaction (formation of three-dimensional polymer) such as non-linear molecular growth occurs, to likely form colored, degraded product or gel. Particularly, if the relative viscosity exceeds 4.20, the abnormal reaction is difficult to avoid. A polyamide resin containing a large amount of the colored, degraded product or gel causes an abnormal increase in the viscosity and has a viscosity with low stability in a molten state and an extremely deteriorated moldability. In addition, the toughness is extremely lowered and the properties, such as resistance to water absorption, chemical resistance, and thermal aging resistance, are also lowered.

In addition to the melt polycondensation conditions, by suitably selecting the charge ratio of the starting dicarboxylic acid component and diamine component, polymerization catalyst, and molecular weight modifier and by selecting the conditions making the polymerization temperature low and the polymerization time short, the polyamide resin of a relative viscosity of 1.80 or more can be more effectively produced. A polyamide resin having a relative viscosity of 2.50 or more is produced preferably by subjecting a polyamide resin having a relative viscosity of less than 2.50 obtained by melt polycondensation to a solid-state polymerization so as to increase the relative viscosity to 2.50 or more. Since a polyamide resin having a relative viscosity of less than 2.50 is produced in advance, the formation of colored product, degraded product, gel and fisheye due to much heat history received during the melt polycondensation is prevented. The solid-state polymerization is conducted by heating pellet or powder of the polyamide resin produced by the melt polycondensation having a relative viscosity satisfying the following formula (5) to a temperature range from 120° C. to less than the melting point of the polyamide resin under reduced pressure or in inert gas atmosphere. The relative viscosity of the polyamide resin which is solid-state polymerized preferably satisfies the following formula (6).

$$1.50 \leq \text{relative viscosity} < 2.50 \quad (5)$$

$$2.50 \leq \text{relative viscosity} \leq 4.20 \quad (6)$$

The water content of the polyamide resin is preferably 0.15% or less and more preferably 0.1% or less. The polyamide resin may be dried by a known method, for example, by a method in which water in the polyamide resin is removed by melt extruding the polyamide resin in a vented extruder while reducing the venting hole pressure or a method in which the polyamide resin is dried in a tumbler (rotary vacuum tank) by heating to a temperature less than the melting point of the polyamide resin in inert gas atmosphere or under reduced pressure, although not limited thereto.

The polyamide resin of the invention is preferably made into a polyamide resin composition prepared by blending 100 parts by weight of the polyamide resin, 0 to 30 parts by weight of a nucleating agent for crystallization, and 10 to 150 parts by weight of inorganic filler.

Inorganic filler generally used in molding resin compositions is usable without particular limitation and inorganic fillers in the form of powder, fiber, granule and flake are used alone or in combination. Powdery filler has a particle size of preferably 100 μm or less and more preferably 80 μm or less, and kaolinite, silica, carbonate, such as calcium carbonate and magnesium carbonate, sulfate, such as calcium sulfate and magnesium sulfate, sulfide, and metal oxide are usable as powdery filler. Glass fiber, whisker of potassium titanate or calcium sulfate, carbon fiber, and alumina fiber are usable as fibrous filler.

If the blending amount of inorganic filler is less than 10 parts by weight, the strength of the molded article of the polyamide resin composition is insufficient in some cases. If exceeding 150 parts by weight, the polyamide resin composition is difficult to be melt kneaded and molded because of a poor flowability.

The polyamide resin composition may be added with a nucleating agent for crystallization according to the molding and processing ability to be required. Talc generally used is usable as the nucleating agent for crystallization. The particle size of talc is preferably 100 μm or less and more preferably 80 μm or less. A blending amount of talc exceeding 30 parts by weight per 100 parts by weight of the polyamide resin is unfavorable, because drawbacks, for example, lowering of flowability in molding the resin and reduction of mechanical property of the obtained molded article, are caused.

The polyamide resin may be included with other resins and additives, such as pigment, dye, lubricant, delustering agent, heat stabilizer, weathering agent, ultraviolet absorber, plasticizer, flame retardant, antistatic agent, and mold release agent. The blending amount of other resins is generally 0 to 20% by weight. The blending amount of additives is generally 0 to 5% by weight.

The polyamide resin of the invention is molded by a molding method, such as injection molding, blow molding, extrusion molding, compression molding, stretching, and vacuum molding. In addition to engineering plastic article, the polyamide resin can be molded into the form of film, sheet, hollow container, fiber ant tube and is suitably used for the production of industrial materials and household articles.

EXAMPLE

The present invention will be described in more detail with reference to the examples and comparative examples. However, it should be noted that the scope of the invention is not limited to the following examples. The evaluations in the examples and comparative examples are made by the following methods.

(1) Concentration of Terminal Amino Group and Terminal Carboxylic Group of Polyamide Resin
Concentration of Terminal Amino Group [$NH_2$] (μeq/g)
In 30 cc of a solution of phenol/ethanol=4/1 by volume, 0.05 to 0.5 g of accurately weighed polyamide resin was completely dissolved at 20 to 50° C. under stirring. The obtained solution was subjected to neutralization titration with a N/100 hydrochloric acid under stirring to determine the concentration of terminal amino group.
Concentration of Terminal Carboxylic Group [COOH] (μeq/g)
In 30 cc of benzyl alcohol, 0.05 to 0.5 g of accurately weighed polyamide resin was completely dissolved at 160 to 180° C. in nitrogen stream under stirring. The obtained solution was cooled to 80° C. or lower in nitrogen stream, added with 10 cc of methanol under stirring, and then subjected to neutralization titration with a N/100 aqueous solution of sodium hydroxide to determine the concentration of terminal carboxylic group.

(2) Relative Viscosity
In 100 mL of a 96% sulfuric acid, 1 g of accurately weighed polyamide resin was dissolved at 20 to 30° C. under stirring. Immediately after completely dissolved, 5 cc of the solution was placed into Cannon-Fenske viscometer. After allowing the viscometer to stand in a thermostatic bath at 25° C. for 10 min, the dropping speed (t) was measured. The dropping speed ($t_0$) of 96% sulfuric acid was measured in the same manner. Using the measured t and $t_0$, the relative viscosity was calculated from the following equation:

$$\text{Relative viscosity} = t/t_0.$$

(3) Gel Permeation Chromatography (GPC)
The GPC measurement was made by using Shodex GPC SYSTEM-11 (Showa Denko K.K.). A measuring sample was prepared by dissolving 10 mg of the polyamide resin in 10 g of hexafluoroisopropanol (HFIP).

Measuring Conditions

Measuring column×2: GPC standard column HFIP-806M (size: 300×8.0 mm I.D., Showa Denko K.K.)
Reference column×2: HFIP-800
Column temperature: 40° C.
Flow rate of solvent: 1.0 mL/min
Standard sample: pMMA The measured results were processed by using a data processing soft SIC-480 II (Showa Denko K.K.) to determine the number average molecular weight (Mn) and the weight average molecular weight (Mw).

(4) DSC (Differential Scanning Calorimeter)

The sample was measured for the melting point, crystallization temperature upon cooling, heat of fusion, heat of crystallization, and grass transition temperature in accordance with as K-7121 and K-7122 using DSC-60 manufactured by Shimadzu Corporation.

(5) Melt Viscosity and Retention of Melt Viscosity

Measured using Capixograph D-1 manufactured by Toyo Seiki Seisaku-Sho, Ltd. (size of die: 2 mmφ×10 mm long) under the conditions: apparent shearing rate of 100/sec, measuring temperature of 300° C., and water content in sample of 1000 ppm or less.

(6) Water Content (% by Weight)

The amount of water was quantitatively measured by using Karl Fischer trace moisture meter (CA-05) and vaporizer (VA-05) each manufactured by Mitsubishi Chemical Corporation under the vaporization condition of 30 min holding at a temperature just below the melting point and then the water content was determined from the measured value (7) Yellowness Index: YI Measured according to JIS K-7105 by using a haze meter (COH-300A) manufactured by Nippon Denshoku Industries Co., Ltd.

(8) Mechanical Properties of Molded Article

Polyamide resin was melted by heating to a temperature higher than its melting point by 20° C. in an injection molding machine (Fanuc 100α) and made into an injection-molded piece under the conditions: injection molding pressure of 600 kgf/cm$^2$, injection time of 1.0 sec, and mold temperature of 80° C. After annealed in a hot air dryer at 160° C. for one hour, the injection-molded piece was subjected to the following tests under absolutely dried condition (see Table 1).

TABLE 1

| | Size of test piece | Measuring apparatus and conditions | Test method |
| --- | --- | --- | --- |
| Impact strength | 6 mm × 12 mm × 60 mm (notched) | U-F Impact Tester (Ueshima Seisakusho Co., Ltd.) | ASTM D256 |
| Tensile test | JIS dumbbell No. 1 3 mm thick | Tensilon UCT-5T (Orientec) | JIS K-7113 |
| Bending test | 6 mm × 12 mm × 120 mm | Tensilon UTM-5T (Orientec) | ASTM D790 |
| Heat deformation temperature | 6 mm × 12 mm × 120 mm | HDT and VSPT Tester (Toyo Seiki Seisaku-Sho, Ltd.) | ASTM D648 Load: 4.6 kgf/cm$^2$, 18.5 kgf/cm$^2$ |

(9) Water Absorptivity

A 2 inch×3 mm test piece of disc shape was prepared, by an injection molding machine in the same manner as in (8). The weight of the test piece was measured under absolutely dried condition. Then the test piece was immersed in boiling water under atmospheric pressure and the change in weight with time was measured. The water absorption at the time the weight no longer changed was taken as the equilibrium water absorption. In addition, the test piece for tensile test prepared in (8) was immersed in boiling water under the same conditions as above and subjected to tensile test, to determine the retention of strength and modulus of elasticity which had been measured under absolutely dried condition.

Example 1

Into a jacketed reaction vessel equipped with a stirring device, a partial condenser, a cooler, a thermometer, a dropping vessel, and a nitrogen gas inlet, 11.294 kg (60.00 mol) of accurately weighed azelaic acid was charged. After fully purging the reaction vessel with nitrogen, the temperature was raised to 170° C. in a small nitrogen stream to melt azelaic acid into a uniform flowable state. To the molten azelaic acid, 8.172 kg (60.00 mol) of p-xylylenediamine (PXDA) was added dropwise over 160 min under stirring. During the addition, the inner pressure of the reaction system was maintained at 0.12 MPa, the inner temperature was continuously raised to 290° C., and the water which was eliminated with the dropwise addition of p-xylylenediamine was distilled out of the reaction system through the partial condenser and cooler. After the addition of p-xylylenediamine, the reaction was continued for 10 min while maintaining the liquid temperature at 290° C. Thereafter, the inner pressure of the reaction system was continuously reduced to 600 mmHg (0.08 MPa) over 10 min, and then, the reaction was further continued for 20 min. During the continued reaction, the reaction temperature was continuously raised to 300° C. After the reaction, the inner pressure of the reaction vessel was raised to 0.2 MPa by nitrogen gas and the polymer was discharged from the nozzle at a lower portion of the polymerization vessel in the form of strand, which was water-cooled and cut into pellets to obtain 16 kg of pellets of the polymer prepared by melt polymerization. The obtained pellets were charged at room temperature into a tumbler (rotary vacuum vessel) having a jacket for passing a heating medium. The pressure of vessel was reduced to 0.5 to 10 torr while rotating the tumbler and the temperature of pellets was raised to 140° C. and maintained there for 5 h by passing the heating medium heated to 160° C. through the jacket. Thereafter, the pressure was returned to atmospheric pressure by introducing nitrogen and the cooling was started. After the temperature of pellets reached 70° C. or lower, the pellets were taken from the vessel, to obtain polyamide resin 1 (PA1). As a result of GPC measurement, the number average molecular weight (Mn) was 16,000, the weight average molecular weight (Mw) was 40,000 and Mw/Mn was 2.5, showing that PA1 was satisfactory in the molecular weight and the molecular weight distribution. The properties of PA1 and the evaluation results of molded article are shown in Table 2. PA1 had high crystallizability, good color, and high retention of melt viscosity after maintained in a molten state. The molded article thereof was good in the mechanical strength, heat resistance, and resistance to water absorption.

Example 2

Polyamide resin 2 (PA2) was obtained in the same manner as in Example 1 except for using 12.135 kg (60.00 mol) of sebacic acid as the dicarboxylic acid component. As a result of GPC measurement, the number average molecular weight (Mn) was 17,100, the weight average molecular weight (Mw) was 43,000 and Mw/Mn was 2.5, showing that PA2 was satisfactory in the molecular weight and the molecular weight distribution. The properties of PA2 and the evaluation results of molded article are shown in Table 2. PA2 had high crystallizability, good color, and high retention of melt viscosity after maintained in a molten state. The molded article thereof was good in the appearance, mechanical strength, heat resistance, and resistance to water absorption.

Example 3

Polyamide resin 3 (PA3) was obtained in the same manner as in Example 1 except for using 12.099 kg (59.82 mol) of sebacic acid as the dicarboxylic acid component, raising the temperature of heating medium to 220° C., and raising the temperature of pellets from 150° C. to 200° C. over about 4 h under reduced pressure. As a result of GPC measurement, the number average molecular weight (Mn) was 40,000, the weight average molecular weight (Mw) was 108,000 and Mw/Mn was 2.7, showing that PA3 was satisfactory in the molecular weight and the molecular weight distribution. The properties of PA3 and the evaluation results of molded article are shown in Table 2. PA3 had high crystallizability, good color, and high retention of melt viscosity after maintained in a molten state. The molded article thereof was good in the appearance, mechanical strength, heat resistance, and resistance to water absorption.

Example 4

Polyamide resin 4 (PA4) was obtained in the same manner as in Example 2 except for using a diamine component consisting of 90 mol % of p-xylylenediamine and 10 mol % of m-xylylenediamine. As a result of GPC measurement, the number average molecular weight (Mn) was 16,300, the weight average molecular weight (Mw) was 44,000 and Mw/Mn was 2.7, showing that PA4 was satisfactory in the molecular weight and the molecular weight distribution. The properties of PA4 and the evaluation results of molded article are shown in Table 2. PA4 had high crystallizability, good color, and high retention of melt viscosity after maintained in a molten state. The molded article thereof was good in the appearance, mechanical strength, heat resistance, and resistance to water absorption.

Example 5

Polyamide resin 5 (PA5) was obtained in the same manner as in Example 2 except for using a dicarboxylic acid component consisting of 50 mol % of adipic acid and 50 mol % of sebacic acid. As a result of GPC measurement, the number average molecular weight (Mn) was 15,500, the weight average molecular weight (Mw) was 42,000 and Mw/Mn was 2.7, showing that PA5 was satisfactory in the molecular weight and the molecular weight distribution. The properties of PA5 and the evaluation results of molded article are shown in Table 2. PA5 had good color and high retention of melt viscosity after maintained in a molten state. In the molded piece taken out of the mold, a small part of surface thereof was transparent to show that the crystallization was insufficient. However, the mechanical strength was sufficient and the heat resistance and resistance to water absorption were good.

Example 6

Into a jacketed 10-L reaction vessel (pressure resistance: 2.5 MPa) equipped with a stirring device, a partial condenser, a cooler, a dropping vessel, and a nitrogen gas inlet, 2.140 kg (10.58 mop of sebacic acid was charged. After fully purging the reaction vessel with nitrogen, the pressure was increased to 0.3 MPa and the temperature was raised to 160° C. to uniformly melt sebacic acid. Then, 1.443 kg (10.60 mol) of p-xylylenediamine (boiling point: 274° C. under atmospheric pressure) was added dropwise over 170 min while stirring the contents. During the addition, the inner temperature was continuously raised from 160° C. to 283° C. In the dropwise addition, the pressure was regulated to 0.5 MPa and the water generated was distilled out of the reaction system through the partial condenser and cooler. The temperature of the partial condenser was regulated within the range from 148 to 152° C. After the dropwise addition of p-xylylenediamine, the pressure was reduced to 0.105 MPa over 120 min at a rate of 0.2 MPa/h. During the pressure reduction, the inner temperature rose to 303° C. Thereafter, the pressure was further reduced to 0.08 MPa and the reaction was continued for 30 rain. The properties of the obtained polyamide resin 6 (PA6) and evaluation results of molded article are shown in Table 2. PA6 had high crystallizability, good color, and high retention of melt viscosity after maintained in a molten state. The molded article thereof was good in the appearance, mechanical strength, heat resistance, and resistance to water absorption.

Comparative Example 1

Polyamide resin 7 (PA7) was obtained in the same manner as in Example 2 except for terminating the reaction 10 min after completing the dropwise addition of p-xylylenediamine. As a result of GPC measurement, the number average molecular weight (Mn) was 9,200, the weight average molecular weight (Mw) was 23,000 and Mw/Mn was 2.5, showing that the molecular weight was extremely low. The properties of PA7 and evaluation results of molded article are shown in Table 2. PA7 had high crystallizability, good color, and high retention of melt viscosity after maintained in a molten state. However, the molded article thereof had poor appearance due to many flashes, insufficient mechanical strength, and poor resistance to water absorption.

Comparative Example 2

Polyamide resin 8 (PA8) was obtained in the same manner as in Example 3 except for using 12.075 kg (59.70 mol) of sebacic acid as the dicarboxylic acid component and raising the temperature of heating medium to 220° C., and raising the temperature of pellets from 150° C. to 210° C. over about 6 h under reduced pressure. As a result of GPC measurement, the number average molecular weight (Mn) was 52,000, the weight average molecular weight (Mw) was 131,100 and Mw/Mn was 2.5, showing that the molecular weight was extremely high. The properties of PA8 and evaluation results of molded article are shown in Table 2. Although the crystallizability of PA8 was high, the yellowness index was high because subjected to much heat history and the retention of melt viscosity after maintained in a molten state was low. The appearance of the molded article thereof was poor because of many flashes, molding sinks and voids.

Comparative Example 3

Into a jacketed reaction vessel equipped with a stirring device, a partial condenser, a cooler, a thermometer, a dropping vessel, and a nitrogen gas inlet, 4.045 kg (20.00 mol) of sebacic acid, 2.724 kg (20.00 mol) of p-xylylenediamine, and 10 kg of distilled water were charged and the reaction vessel was fully purged with nitrogen. The apparatus was hermetically sealed and the temperature of contents was raised to 230° C. over 2 h under stirring. After the reaction pressure reached 2.5 MPa, the charged water and the water eliminated by the reaction were distilled out of the apparatus over 3 h while maintaining the pressure constant, during which the reaction temperature was raised to 250° C. The reaction pressure was reduced to atmospheric pressure over 3 h while continuously distilling off the water, during which the reaction temperature was raised to 290° C. Thereafter, the inner pressure of the reaction system was continuously reduced to 600 mmHg over 10 min and the reaction was continued for 20 rain. During the reaction, the reaction temperature was continuously raised to 300° C. Then, the pellets of polymer produced by melt polymerization were obtained in the same manner as in Example 1. The obtained pellets were dried under the same conditions as in Example 1 to obtain polyamide resin 9 (PA9). As a result of GPC measurement, the number average molecular weight (Mn) was 16,400, the weight average molecular weight (Mw) was 120,000 and Mw/Mn was 7.3, showing that the molecular weight distribution was broad. The properties of PA9 and the evaluation results of molded article are shown in Table 2. PA9 had high yellowness index and low retention of melt viscosity after maintained in a molten state. The molded article thereof was insufficient in the mechanical strength and poor in the resistance to water absorption.

Comparative Example 4

Polyamide resin 10 (PA10) was obtained in the same manner as in Example 1 except for using a diamine component consisting of 30 mol % of p-xylylenediamine and 70 mol % of m-xylylenediamine and using adipic acid as the dicarboxylic acid component. As a result of GPC measurement, the number average molecular weight (Mn) was 15,900, the weight average molecular weight (Mw) was 45,000 and Mw/Mn was 2.8, showing that PA10 was satisfactory in the molecular weight and the molecular weight distribution. The properties of PA10 and the evaluation results of molded article are shown in Table 2. PA10 had good color, but the crystallization heat was not high. In the molded piece taken out of the mold, the surface thereof was transparent to show that the crystallization did not proceed sufficiently. The molded article was poor in the heat resistance and resistance to water absorption.

TABLE 2

| | Examples | | |
|---|---|---|---|
| | 1 | 2 | 3 |
| Polyamide | PA1 | PA2 | PA3 |
| Diamine component | PXDA | PXDA | PXDA |
| | — | — | — |
| Dicarboxylic acid component | azelaic acid | sebacic acid | sebacic acid |
| | — | — | — |
| Mn | 16000 | 17100 | 40000 |
| Mw | 40000 | 43000 | 108000 |
| Mw/Mn | 2.5 | 2.5 | 2.7 |
| Relative viscosity | 2.07 | 2.11 | 4.02 |
| Terminal amino group concentration (μeq/g) | 43 | 41 | 17 |
| Terminal carboxylic group concentration (μeq/g) | 82 | 72 | 31 |
| Reaction molar ratio [NH$_2$]/[COOH] | 0.994 | 0.995 | 0.998 |
| YI | 18 | 17 | 19 |
| Melting point Tm (° C.) | 270 | 281 | 280 |
| Heat of fusion (J/g) | 83 | 74 | 76 |
| Crystallization temperature upon cooling Tcc (° C.) | 243 | 251 | 250 |
| Heat of crystallization (J/g) | 53 | 58 | 56 |
| Glass transition point Tg (° C.) | 79 | 75 | 75 |
| Tg/Tm (K/K) | 0.648 | 0.628 | 0.629 |
| Tm − Tcc (° C.) | 27 | 30 | 30 |
| Water content (%) | 0.04 | 0.03 | 0.01 |
| Melt viscosity (Pa · s) | 260 | 280 | 1200 |
| Retention of melt viscosity (%) | 90 | 92 | 85 |
| Appearance of molded piece | good | good | good |
| Mechanical properties of molded article | | | |
| Tensile modulus of elasticity (GPa) | 3.21 | 3.38 | 3.31 |
| Tensile strength (MPa) | 87.5 | 88.6 | 93.1 |
| Tensile elongation (%) | 11.4 | 12.2 | 15.2 |
| Bending modulus of elasticity (GPa) | 2.41 | 2.52 | 2.54 |
| Bending strength (MPa) | 93.0 | 99.9 | 110.9 |
| Impact strength (J/m$^2$) | 13.5 | 16.7 | 19.2 |
| Heat deformation temperature (° C.) | | | |
| Load of 4.6 kgf/cm$^2$ | 221 | 237 | 232 |
| Load of 18.5 kgf/cm$^2$ | 122 | 125 | 138 |
| Equilibrium water absorption (wt %) | 3.03 | 2.82 | 2.80 |
| Tensile properties after immersion in boiling water | | | |
| Retention of modulus of elasticity (%) | 78 | 81 | 82 |
| Retention of tensile strength (%) | 89 | 95 | 96 |

| | Examples | | |
|---|---|---|---|
| | 4 | 5 | 6 |
| Polyamide | PA4 | PA5 | PA6 |
| Diamine component | 90 mol % of PXDA 10 mol % of MXDA | PXDA | PXDA |
| Dicarboxylic acid component | sebacic acid | 50 mol % of sebacic acid | sebacic acid |
| | — | 50 mol % of adipic acid | — |
| Mn | 16300 | 15500 | 14900 |
| Mw | 44000 | 42000 | 40900 |
| Mw/Mn | 2.7 | 2.7 | 2.7 |
| Relative viscosity | 2.11 | 2.07 | 2.11 |
| Terminal amino group concentration (μeq/g) | 48 | 43 | 42 |
| Terminal carboxylic group concentration (μeq/g) | 81 | 82 | 81 |
| Reaction molar ratio [NH$_2$]/[COOH] | 0.995 | 0.995 | 0.995 |
| YI | 17 | 21 | 16 |
| Melting point Tm (° C.) | 271 | 281 | 281 |
| Heat of fusion (J/g) | 69 | 60 | 75 |
| Crystallization temperature upon cooling Tcc (° C.) | 232 | 222 | 251 |
| Heat of crystallization (J/g) | 41 | 51 | 57 |
| Glass transition point Tg (° C.) | 72 | 84 | 75 |
| Tg/Tm (K/K) | 0.634 | 0.644 | 0.628 |
| Tm − Tcc (° C.) | 39 | 59 | 30 |
| Water content (%) | 0.04 | 0.06 | 0.03 |
| Melt viscosity (Pa · s) | 275 | 280 | 261 |
| Retention of melt viscosity (%) | 90 | 90 | 91 |
| Appearance of molded piece | good | insufficient crystallization | good |
| Mechanical properties of molded article | | | |
| Tensile modulus of elasticity (GPa) | 3.30 | 3.31 | 3.31 |
| Tensile strength (MPa) | 86.5 | 87.9 | 87 |

TABLE 2-continued

| | | | |
|---|---|---|---|
| Tensile elongation (%) | 13.1 | 105 | 12.1 |
| Bending modulus of elasticity (GPa) | 2.48 | 2.44 | 2.52 |
| Bending strength (MPa) | 86.5 | 92.4 | 100.1 |
| Impact strength (J/m$^2$) | 14.5 | 14.5 | 16.3 |
| Heat deformation temperature (° C.) | | | |
| Load of 4.6 kgf/cm$^2$ | 217 | 220 | 235 |
| Load of 18.5 kgf/cm$^2$ | 112 | 118 | 125 |
| Equilibrium water absorption (wt %) | 2.83 | 3.50 | 2.81 |
| Tensile properties after immersion in boiling water | | | |
| Retention of modulus of elasticity (%) | 82 | 75 | 81 |
| Retention of tensile strength (%) | 94 | 85 | 95 |

| | Comparative Examples | |
|---|---|---|
| | 1 | 2 |
| Polyamide | PA7 | PA8 |
| Diamine component | PXDA | PXDA |
| — | | |
| Dicarboxylic acid component | sebacic aid | sebacic acid |
| — | | |
| Mn | 9200 | 52000 |
| Mw | 23000 | 1311000 |
| Mw/Mn | 2.5 | 2.5 |
| Relative viscosity | 1.65 | 5.13 |
| Terminal amino group concentration (μeq/g) | 45 | 18 |
| Terminal carboxylic group concentration (μeq/g) | 90 | 20 |
| Reaction molar ratio [NH$_2$]/[COOH] | 0.993 | 1.000 |
| YI | 15 | 34 |
| Melting point Tm (° C.) | 280 | 280 |
| Heat of fusion (J/g) | 72 | 74 |
| Crystallization temperature upon cooling Tcc (° C.) | 251 | 248 |
| Heat of crystallization (J/g) | 59 | 48 |
| Glass transition point Tg (° C.) | 74 | 75 |
| Tg/Tm (K/K) | 0.627 | 0.629 |
| Tm − Tcc (° C.) | 29 | 32 |
| Water content (%) | 0.03 | 0.03 |
| Melt viscosity (Pa · s) | 90 | 2200 |
| Retention of melt viscosity (%) | 94 | 68 |
| Appearance of molded piece | many flashes | flash, sink, void |
| Mechanical properties of molded article | | |
| Tensile modulus of elasticity (GPa) | 3.24 | 3.39 |
| Tensile strength (MPa) | 42.9 | 98.4 |
| Tensile elongation (%) | 1.3 | 18.2 |
| Bending modulus of elasticity (GPa) | 2.46 | 2.55 |
| Bending strength (MPa) | 72.0 | 112.7 |
| Impact strength (J/m$^2$) | 9.6 | 20.1 |
| Heat deformation temperature (° C.) | | |
| Load of 4.6 kgf/cm$^2$ | 205 | 221 |
| Load of 18.5 kgf/cm$^2$ | 121 | 125 |
| Equilibrium water absorption (wt %) | 2.82 | 2.82 |
| Tensile properties after immersion in boiling water | | |
| Retention of modulus of elasticity (%) | 72 | 81 |
| Retention of tensile strength (%) | 59 | 95 |

| | Comparative Examples | |
|---|---|---|
| | 3 | 4 |
| Polyamide | PA9 | PA10 |
| Diamine component | PXDA | 30 mol % of PXDA |
| | | 70 mol % of MXDA |
| Dicarboxylic acid component | sebacic aid | adipic acid |
| Mn | 16400 | 15900 |
| Mw | 120000 | 45000 |
| Mw/Mn | 7.3 | 2.8 |
| Relative viscosity | 2.72 | 2.10 |
| Terminal amino group concentration (μeq/g) | 73 | 43 |
| Terminal carboxylic group concentration (μeq/g) | 85 | 82 |
| Reaction molar ratio [NH$_2$]/[COOH] | 0.998 | 0.995 |
| YI | 38 | 11 |
| Melting point Tm (° C.) | 279 | 259 |
| Heat of fusion (J/g) | 57 | 45 |
| Crystallization temperature upon cooling Tcc (° C.) | 247 | 207 |
| Heat of crystallization (J/g) | 47 | 36 |
| Glass transition point Tg (° C.) | 70 | 87 |
| Tg/Tm (K/K) | 0.621 | 0.677 |
| Tm − Tcc (° C.) | 32 | 52 |
| Water content (%) | 0.03 | 0.05 |
| Melt viscosity (Pa · s) | 750 | 280 |
| Retention of melt viscosity (%) | 26 | 95 |
| Appearance of molded piece | good | insufficient crystallization |
| Mechanical properties of molded article | | |
| Tensile modulus of elasticity (GPa) | 3.15 | 4.23 |
| Tensile strength (MPa) | 40.3 | 101.0 |
| Tensile elongation (%) | 1.2 | 2.4 |
| Bending modulus of elasticity (GPa) | 2.49 | 3.88 |
| Bending strength (MPa) | 68.0 | 145.0 |
| Impact strength (J/m$^2$) | 10.8 | 18.8 |
| Heat deformation temperature (° C.) | | |
| Load of 4.6 kgf/cm$^2$ | 232 | 192 |
| Load of 18.5 kgf/cm$^2$ | 121 | 109 |
| Equilibrium water absorption (wt %) | 2.82 | 7.26 |
| Tensile properties after immersion in boiling water | | |
| Retention of modulus of elasticity (%) | 74 | 26 |
| Retention of tensile strength (%) | 65 | 50 |

INDUSTRIAL APPLICABILITY

The polyamide resin of the invention is particularly excellent in the molding and processing ability and has high heat resistance, resistance to water absorption, chemical resistance, and excellent mechanical property. The polyamide resin is extremely useful as the resin material for the production of industrial and household products, such as automobile part, parts of electric and electronic equipments, and machine part, and therefore, its industrial value is great.

What is claimed is:

1. A polyamide resin, comprising:
   a constitutional unit derived from diamine component, and
   a constitutional unit derived from dicarboxylic acid component,
   wherein 70 mol % or more of the constitutional unit derived from the diamine component is derived from p-xylylenediamine,
   70 mol % or more of the constitutional unit derived from dicarboxylic acid component is derived from an aliphatic dicarboxylic acid having 6 to 10 carbon atoms,
   a number average molecular weight (Mn) is from 10,000 to 50,000, and
   a degree of dispersion expressed by
   Mw/Mn=weight average molecular weight/number average molecular weight satisfies formula (1)

$$1.5 \leq (Mw/Mn) \leq 3.0 \quad (1),$$

wherein Mn and Mw are determined by a gel permeation chromatography (GPC).

2. The polyamide resin according to claim 1, wherein a relative viscosity is from 1.80 to 4.20 when determined with a solution in concentrated sulfuric acid in a concentration of 1 g/100 mL at 25° C.

3. The polyamide resin according to claim 1, wherein the aliphatic dicarboxylic acid is at least one acid selected from the group consisting of adipic acid, azelaic acid, and sebacic acid.

4. The polyamide resin according to claim 1, wherein retention of melt viscosity (%) after the polyamide resin is maintained in a molten state at a temperature higher than a melting point of the polyamide resin by 10 to 50° C. for 30 min satisfies formula (2)

$$70<(a/b)\times 100<130 \qquad (2),$$

wherein a is a melt viscosity (Pa·s) after maintained in a molten state for 30 min and b is a melt viscosity (Pa·s) after 2.5 min from starting the melting.

5. A polyamide resin composition, comprising:
100 parts by weight of the polyamide resin as defined in claim 1,
0 to 30 parts by weight of an nucleating agent for crystallization, and
10 to 150 parts by weight of inorganic filler.

6. The polyamide resin according to claim 2, wherein the aliphatic dicarboxylic acid is at least one acid selected from the group consisting of adipic acid, azelaic acid, and sebacic acid.

7. The polyamide resin according to claim 2, wherein retention of melt viscosity (%) after the polyamide resin is maintained in a molten state at a temperature higher than a melting point of the polyamide resin by 10 to 50° C. for 30 min satisfies formula (2)

$$70<(a/b)\times 100<130 \qquad (2),$$

wherein a is a melt viscosity (Pa·s) after maintained in a molten state for 30 min and b is a melt viscosity (Pa·s) after 2.5 min from starting the melting.

8. The polyamide resin according to claim 3, wherein retention of melt viscosity (%) after the polyamide resin is maintained in a molten state at a temperature higher than a melting point of the polyamide resin by 10 to 50° C. for 30 min satisfies formula (2)

$$70<(a/b)\times 100<130 \qquad (2),$$

wherein a is a melt viscosity (Pa·s) after maintained in a molten state for 30 min and b is a melt viscosity (Pa·s) after 2.5 min from starting the melting.

9. The polyamide resin according to claim 1, wherein 90 mol % or more of the constitutional unit derived from the diamine component is derived from p-xylylenediamine.

* * * * *

UNITED STATES PATENT AND TRADEMARK OFFICE
CERTIFICATE OF CORRECTION

PATENT NO. : 8,927,647 B2  Page 1 of 1
APPLICATION NO. : 13/119262
DATED : January 6, 2015
INVENTOR(S) : Tomomichi Kanda et al.

It is certified that error appears in the above-identified patent and that said Letters Patent is hereby corrected as shown below:

In the Specification, in TABLE 2-continued:

Column 17, line 2, "105" should read --"10.5";
line 23, "1311000" should read --"131100".

Signed and Sealed this
Fifth Day of May, 2015

Michelle K. Lee
*Director of the United States Patent and Trademark Office*